United States Patent
Jones et al.

(10) Patent No.: US 10,326,300 B2
(45) Date of Patent: Jun. 18, 2019

(54) APPARATUS AND METHOD FOR GENERATING ELECTRICAL ENERGY WITH SHOPPING CARTS

(71) Applicant: Walmart Apollo, LLC, Bentonville, AR (US)

(72) Inventors: Matthew A. Jones, Bentonville, AR (US); Nicholaus A. Jones, Fayetteville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 319 days.

(21) Appl. No.: 15/423,031

(22) Filed: Feb. 2, 2017

(65) Prior Publication Data
US 2017/0229903 A1     Aug. 10, 2017

Related U.S. Application Data

(60) Provisional application No. 62/291,458, filed on Feb. 4, 2016, provisional application No. 62/291,175, filed on Feb. 4, 2016.

(51) Int. Cl.
| | | |
|---|---|---|
| *H02K 7/10* | (2006.01) | |
| *H02J 7/14* | (2006.01) | |
| *H02K 7/18* | (2006.01) | |

(52) U.S. Cl.
CPC .......... *H02J 7/1407* (2013.01); *H02K 7/1846* (2013.01)

(58) Field of Classification Search
CPC .............................. H02K 7/1846; H02J 7/1407
(Continued)

(56) References Cited

U.S. PATENT DOCUMENTS 5,072,956 A * 12/1991 Tannehill .............. B62B 3/1408
                                                              280/33.992
7,225,980 B2    6/2007 Ku
(Continued)

FOREIGN PATENT DOCUMENTS

| CN | 203974876 U | 12/2012 |
|---|---|---|
| CN | 104908792 A | 9/2015 |

(Continued)

OTHER PUBLICATIONS

Ecofriend; "Eco Gadgets: E-Cart aims to power a supermarket by harnessing kinetic energy", http://www.ecofriend.com/eco-gadgets-ecart-aims-to-power-a-supermarket-by-harnessing-kinetic-energy.html, printed Nov. 6, 2015, pp. 1-5.

*Primary Examiner* — Hanh N Nguyen
(74) *Attorney, Agent, or Firm* — Fitch, Even, Tabin & Flannery LLP

(57) ABSTRACT

Systems, apparatuses and methods are provided herein for generating energy with a shopping cart. A shopping cart apparatus comprises: a front wheel, a back wheel, a bottom frame, and a power generator assembly. The power generator assembly comprises: a generator coupled to the back wheel, the generator being configured to convert kinetic energy from a rotation of the back wheel to electrical energy, a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel, and a first contact member and a second contact member coupled to the capacitor element and configured to discharge the electrical energy stored in the capacitor element.

21 Claims, 7 Drawing Sheets

(58) Field of Classification Search
USPC .......................... 290/1 R; 29/596; 310/75 R
See application file for complete search history.

(56) References Cited

U.S. PATENT DOCUMENTS

| | | | |
|---|---|---|---|
| 8,120,190 B2 | 2/2012 | Bravo | |
| 2006/0249320 A1* | 11/2006 | Carter | ..................... A47F 10/04 |
| | | | 180/65.51 |
| 2010/0148582 A1* | 6/2010 | Carter | ................ B60L 11/1861 |
| | | | 307/48 |
| 2012/0115071 A1* | 5/2012 | Fleury | ...................... C25B 9/06 |
| | | | 429/523 |

FOREIGN PATENT DOCUMENTS

| | | |
|---|---|---|
| JP | 2010204999 A | 9/2010 |
| WO | 2013092258 | 6/2013 |

* cited by examiner

APPARATUS AND METHOD FOR GENERATING ELECTRICAL ENERGY WITH SHOPPING CARTS

CROSS-REFERENCE TO RELATED APPLICATION

This application claims the benefit of U.S. Provisional Application No. 62/291,458, filed Feb. 4, 2016, and U.S. Provisional Application No. 62/291,175, filed Feb. 4, 2016, which are incorporated herein by reference in their entirety.

TECHNICAL FIELD

This invention relates generally to shopping carts.

BACKGROUND

Most grocery stores offer shopping carts that customers can use while they are shopping in the store. These shopping carts generally have a basket portion, a handle, and wheels. Some shopping carts are designed to be docked together. Some shopping facilities also use powered cart pushers to help associates move shopping carts around.

BRIEF DESCRIPTION OF THE DRAWINGS

Disclosed herein are embodiments of apparatuses and methods for generating electrical energy with shopping carts in a shopping space. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for generating energy with shopping carts. A shopping cart apparatus comprises a front wheel, a back wheel, a bottom frame coupled to the front wheel and the back wheel, and a power generator assembly. The power generator assembly comprises a generator coupled to the back wheel, the generator being configured to convert kinetic energy from a rotation of the back wheel to electrical energy, a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel, and a first contact member and a second contact member coupled to the capacitor element and configured to discharge the electrical energy stored in the capacitor element.

In some embodiments, a shopping cart may capture energy from being pushed around, and store the energy in a capacitor or battery. The energy may then be returned to a power grid or be used to operate a cart pusher. Carts may be fitted with a generator on the rear wheels. The rotational force from the cart being pushed may create electricity through a generator. That electricity may then be stored in a battery or a capacitor on a lower bar of the cart. When multiple carts come in contact with each other, the carts create a larger circuit through docking points. Once enough carts are docked together, the store energy may be leveraged to drive a cart pusher or the energy may be returned to a store's power grid.

Figure 1:
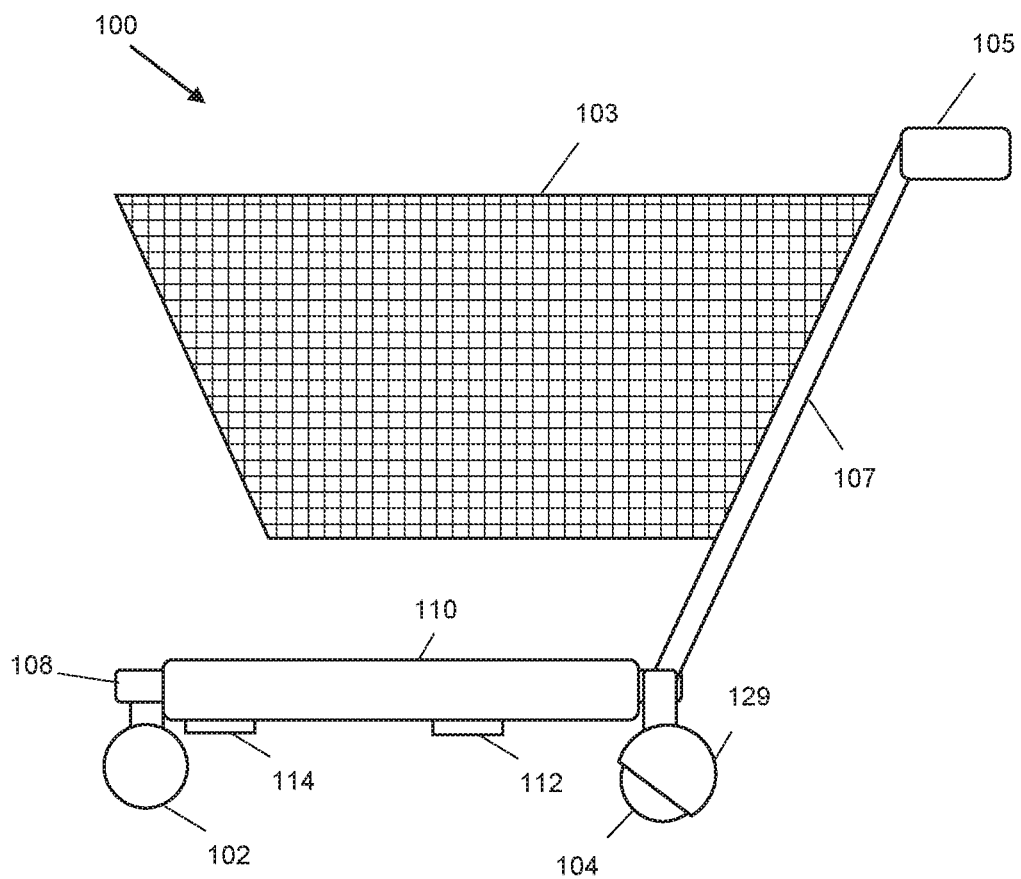
FIG. 1 is an illustration of a shopping cart in accordance with several embodiments.

Referring now to FIG. 1, a shopping cart apparatus is shown. The shopping cart 100 includes a basket portion 103, a handle portion 105, vertical frame portion 107, a bottom frame 108, one or more front wheels 102, and one or more back wheels 104. The shopping cart 100 further includes a generator assembly comprising a generator 129, a capacitor element 110, and electrical contact members 112 and 114.

The shopping cart 100 may generally be a moveable item container configured to travel in a shopping space. The basket portion 103 may be configured to hold a plurality of items for a customer while the customer shops in a store. In some embodiments, the basket portion 103 may include other conventional components not shown in FIG. 1 such as a child seat, a swinging rear door, a divider, etc. The handle portion 105 is generally configured to be held by a user when the shopping cart 100 is pushed or pulled. The vertical frame portion 107 may couple the handle portion 105 and the basket portion 103 to the bottom frame 108. In some embodiments, two or more of the vertical frame portion 107, the basket portion 103, the handle portion 105, and the bottom frame 108 may be formed by a continuous material. The shopping cart 100 may be configured to be docked or stacked with other similar shopping carts. For example, the basket portion 103 may comprise a swinging rear door that is configured to be pushed open by the basket portion of another shopping cart to dock the shopping carts together to reduce the space needed for cart storage.

The bottom frame 108 may generally be configured to couple the front wheels 102 to the back wheels 104. In some embodiments, the bottom frame 108 may comprise a U-shaped structure that is opened toward the back of the shopping cart 100 for receiving another similar shopping cart behind the shopping cart 100 between the back wheels 104. In some embodiments, the bottom frame 108 may be narrower and/or lower in the front and wider and/or higher in the back to allow a series of similar shopping carts to dock with one another front to back. The front wheels 102 and the back wheels 104 may generally comprise any conventional wheel system configured to travel in a shopping space. In some embodiments, the shopping cart may comprise a single front wheel and the bottom frame may comprise a V-shaped structure. In some embodiments, the shopping cart 100 may comprise two front wheels. In some embodiments, the front wheels 102 may comprise pivoting axles that allow the axle orientation of the front wheel(s) to turn left and right relative to the body of the shopping cart. In some embodiments, the back wheels 104 may comprise fixed axles such the axle orientation of the back wheels 104 are fixed relative to the body of the shopping cart 100. Further descriptions of embodiments of the bottom frame 108 are provided with reference to FIGS. 4A-B herein.

The generator 129 may be coupled to the back wheel 104 of the shopping cart 100 and may generally comprise any device configured to convert kinetic energy from the rotation of the wheel to electrical energy. In some embodiments, the generator 129 may comprise a stator element and a rotator element for generating energy from the rotation of the wheel. Generally, the rotation of the wheel may cause the relative motion between the stator element and the rotator element of the generator 129. In some embodiments, the generator may comprise lap and/or wave winding. While the generator is coupled to the back wheel 104 in FIG. 1, in some embodiments, the generator 129 and/or an additional generator may be coupled to the front wheel of the shopping cart. Further descriptions of embodiments of the generator 129 is provided with reference to FIG. 3 herein.

The capacitor element 110 may comprise a first electrode and a second electrode separated by a dielectric material. In some embodiments, the capacitor element 110 may be cylindrically shaped and a portion of the bottom frame 108 may comprise the core of the cylindrical capacitor element. In some embodiments, a portion of the bottom frame 108 comprises an electrode of the capacitor element 110. For example, an elongated member of the bottom frame 108 may be coupled to a negative terminal of the generator to serve as the electrode of the capacitor, and the elongated member of the bottom frame 108 may be wrapped with a dielectric material and another electrode that is coupled to a positive terminal. In some embodiments, dielectric material and an electrode core may be inserted into an elongated member of the bottom frame to form a capacitor within the hollow of the bottom frame. In some embodiments, the portion of the bottom frame 108 used as the electrode of the capacitor element 110 may be insulated or uninsulated from other portions of the shopping cart 100 such as the wheels' housings and the vertical frame portion 107. In some embodiments, the capacitor element 110 may comprise an insulator covering the electrodes and dielectric material. While the capacitor element 110 is shown to be coupled to the bottom frame 108 of the shopping cart 100, in some embodiments, the capacitor element 110 and/or additional capacitor elements may be coupled to other portions of the shopping cart 100 such as the vertical frame portion 107, the handle portion 105, and the basket portion 103. For example, the capacitor element 110 and/or additional capacitor elements may be formed in or around the vertical frame portion 107, the handle portion 105, and/or parts of the basket portion 103. While a capacitor element is described herein, in some embodiments, the shopping cart may include a battery for storing the energy generated by the generator 129 in addition to or instead of the capacitor element 110.

The electrical contact members 114 and 112 may generally comprise conductors configured to couple to other similar shopping carts and/or discharge devices. In some embodiments, the electrical contact members 114 and 112 may comprise two contacts, one coupled to each of the electrodes of the capacitor element 110. In some embodiments, the electrical contact members 114 and 112 may each comprise a positive and a negative terminal coupled to different electrodes of the capacitor element 110. In some embodiments, the electrical contact members 114 and 112 may lay flat on one or more of the body of the shopping cart 100 and the exterior of the capacitor element 110. In some embodiments, the electrical contact members 114 and 112 may protrude below, above, inside, or outside of the bottom frame. While the electrical contact members 112 and 114 are shown to be positioned on the capacitor element 110 in FIG. 1, in some embodiments, the electrical contact members 112 and 114 may be positioned on any portion of the shopping cart 100 that allows the electrical contacts of similar shopping carts to contact each other when the shopping carts are docked together. For example, the electrical contacts may be positioned near the wheels, around the frame of the basket portion 103, etc. In some embodiments, each electrical contact may comprise an area of contact and/or a mechanical coupler. Generally, the electrical contact members 114 and 112 may comprise any coupling device that allows electrical energy to flow between the contacts when multiple similar shopping carts are docked together and/or when a shopping cart is coupled with a discharge device. In some embodiments, the electrical contact members 112 and 114 are configured to couple capacitor elements on shopping carts that are docked together in parallel. Further descriptions of embodiments of the electrical contacts is provided with reference to FIGS. 4A-B herein.

Generally, the generator 129, the electrical contact members 112 and 114, and the capacitor element 110 are electrically coupled in a way as to allow the generator 129 to charge the capacitor element 110 when the back wheels 104 rotate and to allow the capacitor element 110 to discharge via the electrical contact members 112 and 114. An example circuit diagram in accordance with some embodiments of the generator assembly is provided with reference to FIG. 5 herein. In some embodiments, the generator assembly may further comprise a sensor device for detecting the presence of a powered device. In some embodiments, the sensor device comprises a sensor positioned in the front end of the shopping cart 100 and/or the bottom frame 108. In some embodiments, the sensor device may be positioned near and/or integrated with one or more electrical contact members 112 and 114. In some embodiments, the sensor device may be configured to detect whether a similar shopping cart and/or a discharge device (e.g. a docking station coupled to the main electric grid, a cart pusher vehicle, etc.) is coupled to the shopping cart. The electrical contact members 112 and 114 may be configured to only discharge the energy stored in the capacitor element 110 if the sensor device senses the presence of another shopping cart or discharge device. In some embodiments, the sensor device may comprise one or more of a mechanically actuated switch, a proximity sensor, a current sensor, a voltage sensor, an optical sensor, a radio frequency sensor, an electrical field sensor, and the like. In some embodiments, the sensor device may control a switch between the electrodes of the capacitor element 110 and one or more of the electrical contact members 112 and 114 for selectively discharging the capacitor element 110.

While, in FIG. 1, one generator assembly is shown from the side view of the shopping 100, in some embodiments, a second generator assembly may be coupled to the elongated member of the bottom frame 108 on the other side of the capacitor element 110. In some embodiments, the second generator assembly may share one or more of the generator 129, the capacitor element 110, and the electrical contact members 114 and 112. For example, the shopping cart 100 may comprise two generators each coupled to a different back wheel 104 that are both configured to charge the same capacitor element 110. In another example, the generator 129 may charge both the capacitor element 110 and a second capacitor element positioned on the other side of the bottom frame. In some embodiments, the capacitor of the generator assembly and the capacitor element 110 may be coupled in parallel and be configured to discharge via the same set(s) of electrical contacts. In some embodiments, the second generator assembly positioned on the other side of the bottom frame may operate independently of the generator assembly shown in FIG. 1.

While a standard one basket type shopping cart is shown in FIG. 1, in some embodiments, the generator assembly may also be similarly coupled to other types of shopping carts such as two basket type shopping carts, flatbed shopping carts, motorized shopping carts, foldable shopping carts, etc.

Figure 2:
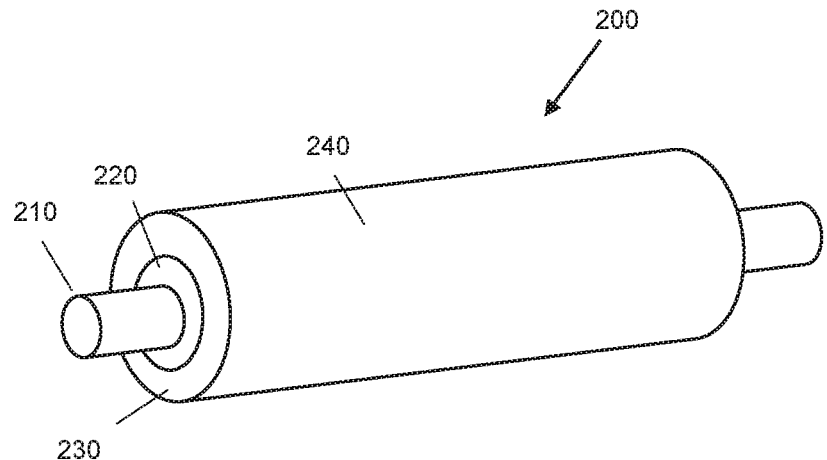
FIG. 2 is an illustration of a capacitor element in accordance with several embodiments.

Referring now to FIG. 2, a capacitor element according to some embodiments as shown. The capacitor element 200 comprises a first electrode 210, a dielectric material 220, a second electrode 230, and an insulator 240 covering the second electrode 230. In some embodiments, the capacitor element 200 may comprise the capacitor element 110 described with reference to FIG. 1. In some embodiments, the first electrode 210 may comprise a portion of the shopping cart such as an elongated portion of the bottom frame of a shopping cart. The first electrode 210 may comprise a solid core or a hollow tube of conductive material. In some embodiments, the first electrode 210 may comprise a layer of conductive material wrapped around an elongated member of a shopping cart. In some embodiments, the dielectric material 220 may comprise a cylindrical dielectric layer wrapped around the first electrode 210, and the second electrode 230 may comprise a conductor layer wrapped around the dielectric material. Generally, the first electrode 210 and the second electrode 230 may comprise any conductive material such as metal and metal alloy, and the dielectric material 220 may comprise any dielectric such as glass, ceramic, plastic film, air, vacuum, paper, mica, oxide layer, etc. In some embodiments, the first electrode 210 may be coupled to the negative terminal of a generator and/or a discharge device and the second electrode 230 may be coupled to the positive terminal of the generator and/or the discharge device, or vice versa. In some embodiments, the insulator 240 may comprise a layer of dielectric material covering the second electrode. In some embodiments, the capacitor element 200 may comprise electrodes and dielectric material rolled up in thin layers. In some embodiments, the first electrode 210 may be insulated or uninsulated from the body of the shopping cart. In FIG. 2, the relative thickness of the electrodes 210 and 230, the dielectric material 220, and the insulator 240 are representative illustrations and may not necessarily be to scale. While FIG. 2 shows a cross section of the capacitor element 200, in some embodiments, the insulator 240 may also cover the sides (flat circular planes) of the capacitor element 200. In some embodiments, an insulator 240 may insulate at least the second electrode 230 from contacting the body of the shopping cart coupled to the capacitor element 200 and/or another shopping cart. In some embodiments, the body of the shopping cart may form the second electrode 230, and the first electrode 210 and the dielectric material 220 may be inserted into an elongated and hollow member of the bottom frame of the shopping cart to form a capacitor element.

Figure 3:
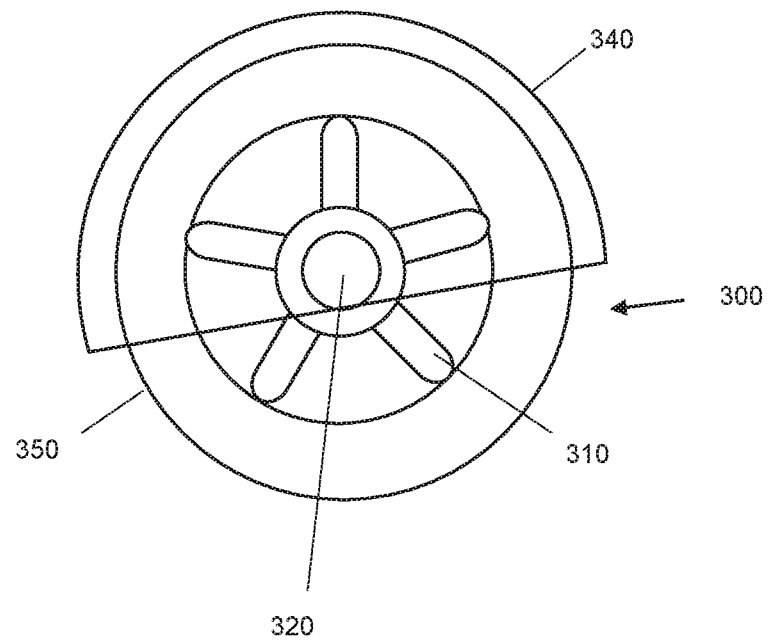
FIG. 3 is an illustration of a shopping cart wheel in accordance with several embodiments.

Referring now to FIG. 3, a wheel of a shopping cart according to some embodiments is shown. The wheel assembly 300 includes a wheel 350, an axle 320, and a covering 340. In some embodiments, the wheel assembly 300 may include the generator 129 described with reference to FIG. 1. In some embodiments, a stator element of the generator may be included within the covering 340 of the wheel 350 and a rotator element 310 may be included in the wheel 350. In some embodiments, a stator element of the generator may be included in the axle 320 to generator energy with the rotator element 310 in the wheel 350. In some embodiments, the stator element(s) may comprise field poles. In some embodiments, the rotator element 310 may comprise one or more cores with lap or wave winding. In some embodiments, the winding may be winded around the axle 320. In some embodiments, the winding may wind around cores that extend away from the center of the wheel 350. Generally, a generator is configured to convert the kinetic energy of the rotation of the wheel 350 into electrical energy. In some embodiments, the generator may comprise any conventional electrical energy generator types such as one or more of a direct current power generator, a docking station alternating current power generator, a homopolar generator, an induction generator, a linear electric generator, etc.

Figure 4A:
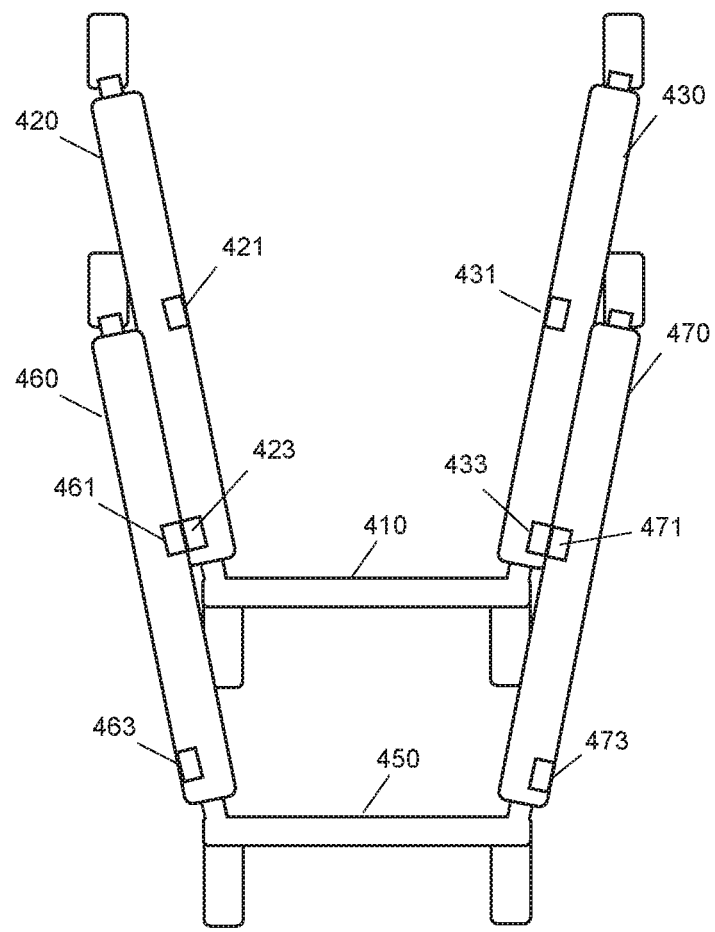
FIGS. 4A and 4B are illustrations of electrical contacts on shopping carts in accordance with several embodiments.
Figure 4B:
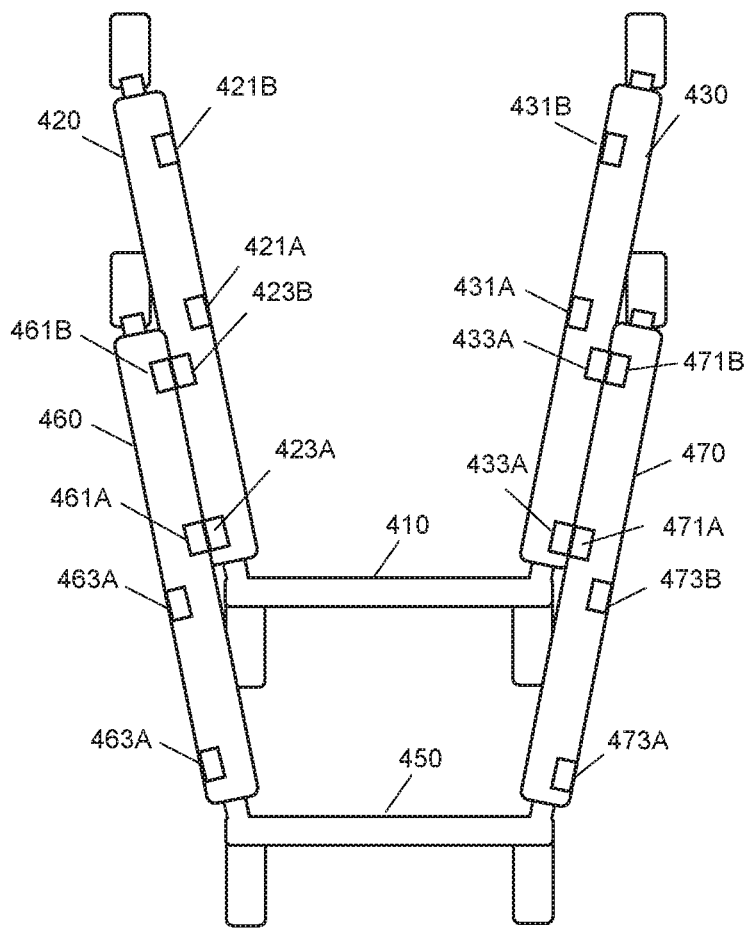

Referring now to FIGS. 4A and 4B, electrical contacts on shopping carts according to some embodiments is shown. FIGS. 4A and 4B generally show the bottom frames of two shopping carts that are docked together front to back. The first shopping cart 410 includes a first capacitor element 420 and a second capacitor element 430. The second shopping cart 450 also includes a first capacitor element 460 and a second capacitor element 470. In the embodiment shown in FIG. 4A, when the first shopping cart 410 is docked into the second shopping cart 450, electrical contacts 423 and 433 of the first shopping cart 410 are configured to contact the electrical contacts 461 and 471, respectively, on the second shopping cart 450. Electrical contacts 421 and 431 may be configured to similarly couple with another shopping cart and/or a discharge device docked behind the first shopping cart 410. Electrical contact 463 and 473 may be configured to similarly couple with another shopping cart and/or a discharge device docked in front of the second shopping cart 450. In some embodiments, each of the electrical contacts shown in FIG. 4A may comprise a positive terminal and a negative terminal positioned close to each other. In some embodiments, capacitor elements on a shopping cart (e.g. capacitors elements 420 and 430 on the first shopping cart 410) may share one or more electrical contacts. For example, electrical contact 423 may be coupled to the positive terminals and electrical contact 433 may be coupled to negative terminals of both capacitor elements 420 and 430.

In some embodiments, the positive and negative terminals of the electrical contacts may be spaced apart along the length of the elongated member of the bottom frame as shown in FIG. 4B. Generally, in FIG. 4B, all contacts having a reference number ending in A may represent a first polarity (e.g. negative or positive), and all contacts having a reference number ending in B may represent the opposite polarity. In the embodiment shown in FIG. 4B, when the first shopping cart 410 is docked into the second shopping cart 450, electrical contacts 423A, 423B, 433A, and 433B of the first shopping cart 410 are configured to contact the electrical contacts 461A, 461B, 471A, and 471B, respectively, on the second shopping cart 450. Electrical contacts 421A, 422B, 431A, and 432B may be configured to similarly couple with another shopping cart and/or a discharge device docked behind the first shopping cart 410. Electrical contacts 463A, 463B, 473A, and 473B may be configured to similarly couple with another shopping cart and/or a discharge device docked in front of the second shopping cart 450.

In some embodiments, the electrical contacts in FIGS. 4A and 4B generally represent the location of the contacts. In some embodiments, the electrical contacts may lay flat on the capacitor element and/or the shopping cart. In some embodiments, the electrical contacts may protrude below, above, inside, or outside of the bottom frame. In some embodiments, the electrical contact may only be positioned on one side of such protrusion. In some embodiments, the electrical contacts may be positioned on any portion of the shopping cart that allows the electrical contacts of similar shopping carts to contact each other when the shopping carts are docked together. For example, the electrical contacts may be positioned near the wheels, around the frame of the basket portion, etc. In some embodiments, each electrical contact may comprises an area of contact and/or a mechanical coupler. For example, the electrical contact 461 may comprise a notch and the electrical contact 423 may be configured to slides into the socket of electrical contact 461 when the shopping carts are docked. In some embodiments, each of the electrical contacts shown in FIG. 4A may comprise a mechanical coupling device such as a slot, a wedge, a protrusion and the like. Generally, the electrical contacts in FIGS. 4A and 4B may comprise any coupling device that allows electrical energy to flow between the contacts when multiple similar shopping carts are docked together. In some embodiments, the electrical contacts in FIGS. 4A and 4B are configured to couple capacitor elements on shopping carts that are docked together in parallel to each other. In some embodiments, capacitors elements on a shopping cart are also coupled together in parallel.

Figure 5:
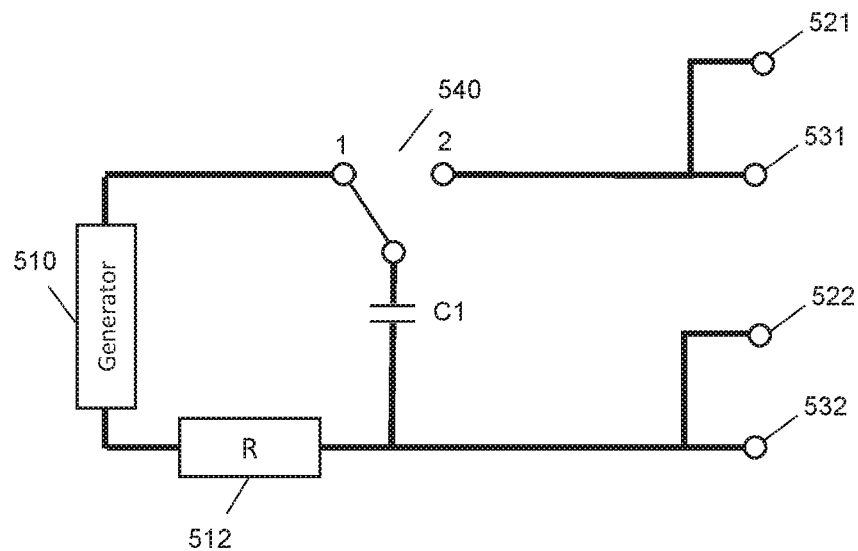
FIG. 5 is a simplified circuit diagram of a generator assembly in accordance with several embodiments.

Referring now to FIG. 5, a circuit diagram of a generator assembly is shown. The generator assembly includes a generator 510, a capacitor C1, a switch 540, a resistor 512 and contacts 521, 531, 522, and 532. The generator 510 may comprise any generator device configured to convert the rotational motion of a wheel to electrical energy. In some embodiments, the generator 510 may comprise one or more of the generator 129 of FIG. 1 and wheel assembly 300 of FIG. 3. The generator 510 and the charging resistor 512 may be configured to charge the capacitor C1 with the energy generated by the generator 510. In some embodiments, the generator assembly may further comprise a switch and/or a drain resistor for dissipating the energy generated by the generator 510 after the capacitor is fully charged.

The contacts 521 and 531 may be coupled to the positive terminal of the capacitor C1 and the contacts 522 and 532 may be coupled to the negative terminal of the capacitor C1. Contacts 521 and 522 may comprise a first pair of contacts and contacts 531 and 532 may comprise a second pair of contacts. Each pair of contacts may be configured to couple to a different shopping cart and/or a discharge device. For example, contacts 521 and 522 may be configured to couple with a shopping cart or discharge device docked behind the shopping cart having the generator assembly, while contacts 531 and 532 may be configured to couple with a shopping cart or discharge device docked in front the shopping cart having the generator assembly.

The switch 540 may generally switch the generator assembly between a charging state (1) and a discharging state (2). When the switch 540 is in the first position as shown in FIG. 5, the capacitor C1 may be charged by the generator 510. When the switch 540 is in a second position, the capacitor is coupled to the contacts 521, 531, 522, and 532. In some embodiments, the switch 540 may be controlled by a sensor device that detects the presence of another shopping cart and/or a discharging device. In some embodiments, the switch 540 may be switched to the second position only when the sensor device detects that the shopping cart is docked with another shopping cart and/or with a discharge device. In some embodiments, the sensor device may comprise one or more of a mechanically actuated switch, a proximity sensor, a current sensor, a voltage sensor, an optical sensor, a radio frequency sensor, an electrical field sensor, and the like. In some embodiments, the switch 540 may be control by a sensor device that detects for a voltage differential between contacts 521 and 522 and/or 531 and 532. For example, if the contacts 521 and 532 are coupled to the capacitor element of another shopping cart and/or a discharge device, the detected voltage differential may cause the switch 540 to be moved to the second position. In some embodiments, the switch 540 may be selectively triggered by a discharged device coupled to the shopping cart. For example, each shopping cart may comprise a switch terminal that can be coupled together and to a discharge device. When a discharge device is coupled to one or more shopping carts, the discharge device may send a signal down the switch terminals to trigger the switches on the shopping carts to a discharge state to discharge the energy stored in the capacitors.

Figure 6:
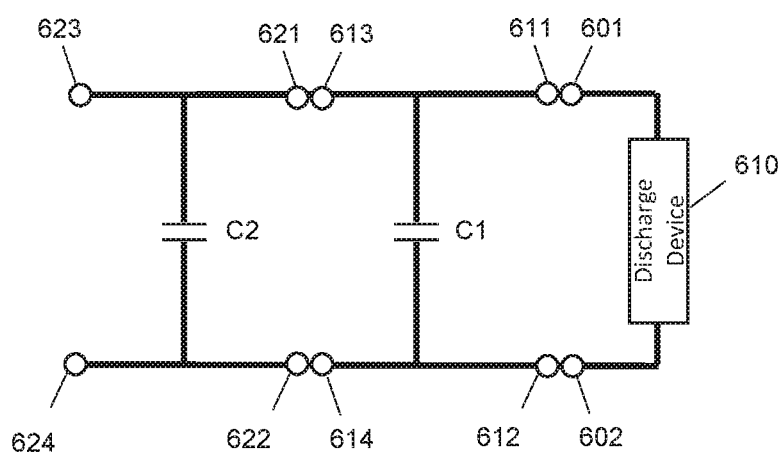
FIG. 6 is a simplified circuit diagram of coupled capacitors in accordance with several embodiments.

Referring now to FIG. 6, a simplified circuit diagram of coupled capacitors is shown. In FIG. 6, a discharge device 610 is coupled to a first capacitor C1 on a first shopping cart and a second capacitor on a second shopping cart C2. The discharge device 610 may generally be any device configured to discharge, store, and/or use the energy stored in capacitors C1 and C2. In some embodiments, the discharge device 610 may comprise a docking station coupled to a store electric grid that discharges the stored energy for use by various electrical devices in a shopping space. In some embodiments, the discharge device 610 may comprise a cart pusher vehicle configured to use the discharged energy to move the shopping carts. Descriptions of a push cart type discharge device according to some embodiments is provide with reference to FIG. 7 herein. The discharge device 610 may include at least two contacts 601 and 602 configured to couple to electrical contacts on shopping carts The first shopping cart includes the first capacitor C1 and contacts 611, 612, 613, and 614. Contacts 611 and 612 are coupled to contacts of the discharge device mechanically coupled to the first shopping cart. Contacts 613 and 614 are coupled to contacts of the second shopping cart docked with the first shopping cart. The second shopping cart includes the second capacitor C2 and contacts 621, 622, 623, and 624. The second capacitor C2 is coupled to the discharge device through contacts 621 and 622 via the first shopping cart. In some embodiments, as shown in FIG. 6, when shopping carts are docked with each other, the capacitors on each shopping cart are coupled in parallel. In some embodiments, additional shopping carts may be similarly docked into the second shopping cart and add additional capacitors to the circuit. In some embodiments, a single shopping cart may comprise two or more capacitors and the capacitors on a shopping cart may be electrically coupled to each other. In some embodiments, capacitors on the right and left sides of shopping carts may form separate capacitor chains that separately couples to the discharge device. While shopping carts with capacitor elements are described herein, in some embodiments, the discharge device may be configured to similarly discharge batteries on shopping carts that store energy generated by the movement of the shopping carts.

Figure 7:
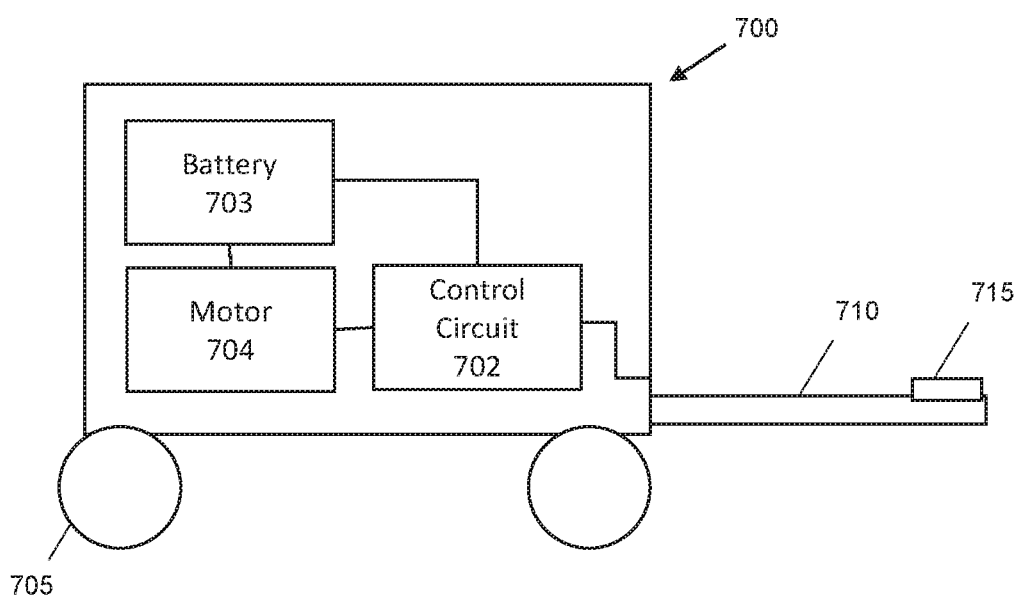
FIG. 7 is a block diagram of a cart pusher apparatus in accordance with several embodiments.

Referring now to FIG. 7, a cart pusher apparatus is shown. A cart pusher 700 comprises a control circuit 702, a battery 703, a motor 704 configured to drive a wheel system 705, and a cart coupler 710. While the term "cart pusher" is used herein a motorized device for moving carts, it is generally understood that a cart pusher may be used to push carts from behind or pull carts from the front.

The control circuit 702 may comprise one or more of a processor, a microprocessor, a hardwired circuitry, and the like. Generally, the control circuit 702 is configured to control various components in the cart pusher 700 based on received commands. In some embodiments, the cart pusher 700 may comprise one or more user interface devices such as buttons and switches for a human operator to control the cart pusher via the control circuit 702. In some embodiments, the cart pusher 700 may comprise an automatous or semi-autonomous vehicle and the control circuit 702 may be configured to operate the cart pusher 700 based on commands received wirelessly from a central computer system.

In some embodiments, the control circuit 702 may be configured to trigger the discharge of one or more capacitor elements on shopping carts to power the motor 704. In some embodiments, the discharge may be triggered in response to a start command from either a human operator or a central computer system. The discharged energy may be used to move the shopping carts from a stop state to overcome the inertia of the stop state. In some embodiments, the discharged energy may be routed to the battery 703 prior to being applied to the motor 704. In some embodiments, the discharged energy may bypass the battery 703 and be directly applied to the motor 704. In some embodiments, the discharged energy may be at least partially stored on the battery 703 to charge the battery 703 for later use. In some embodiments, the cart pusher 700 may further comprise a transformer and/or other electrical components for regulating the voltage and/or current of the discharged energy prior to applying the energy to the battery 703 and/or the motor 704.

The battery 703 may comprise any conventional battery system. In some embodiments, the battery 703 may comprise one or more physical battery devices. For example, one battery may be configured to be charged by the energy discharged from a capacitor element of a shopping cart and another battery may be configured to be charged by energy from an electric grid. The battery 703 is generally configured to power the motor 704 to drive the wheel system 705. In some embodiments, the battery 703 configured to supply power to the motor in an absence of the electrical energy discharged from the capacitor element. In some embodiments, the battery 703 may comprise part of a power source of the cart pusher 700. The motor 704 may generally be any type of AC or DC motor configured to drive a wheel system 705. The wheel system 705 may comprise two or more wheels configured to provide locomotion to the cart pusher 700 and one or more shopping carts coupled to the cart pusher. In some embodiments, the cart pusher 700 may have any number of total wheels, and any number of wheels that are directly driven by the motor 704.

The cart coupler 710 may generally comprise any coupling structure configured to physically secure one or more shopping carts to the cart pusher 700 such that the wheel system 705 may provide locomotion to the shopping carts. In FIG. 7, the cart coupler 710 is configured to extend below a shopping cart to couple to a shopping cart. In some embodiments, the cart coupler 710 may comprise a rigid elongated member configured to reach below the shopping cart. In some embodiments, the cart coupler 710 may be of similar shape as a bottom frame of a shopping cart. In some embodiments, the cart coupler may be configured to couple other portions of a shopping cart such as the back wheel, the vertical frame portion, the basket, etc. Generally, the cart coupler may comprise any conventional cart coupler on a cart pusher device.

The contact 715 may be configured to couple with electrical contacts on a shopping cart to discharge the energy stored in one or more capacitors on one or more shopping carts. In FIG. 7, the contact 715 is positioned on an elongated cart coupler, and the cart coupler 710 is configured to extend the contact 715 underneath the cart to contact electrical contacts positioned on the bottom frame of the cart. The positioning and coupler type of the contact 715 may generally be based on the positioning and coupler type of electrical contacts on shopping carts, such as the contacts described with reference to FIGS. 4A and 4B herein. In some embodiments, the contact 715 may match or be similar to the contacts on the shopping cart that are configured to couple with a second shopping cart docked to the front or to the back of that shopping cart. For example, referring back to FIGS. 4A, and 4B, the contact 715 may comprise one or more contact points such as electrical contacts 423 and 433 and/or 423A-B and 433A-B on the first shopping cart 410. In some embodiments, the contact 715 may comprise two contact points positioned along the length of the cart coupler 710. In some embodiments, the contact 715 may be separated from the cart coupler 710. For example, the contact 715 may comprise a cable that extends from the cart pusher 700 and to connect with one or more generator assemblies on one or more shopping carts.

Figure 8:
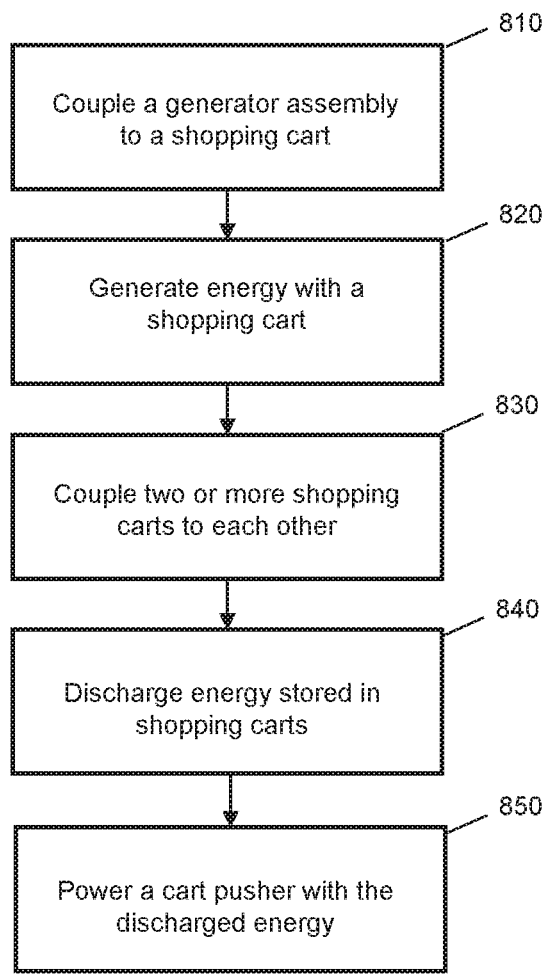
FIG. 8 is a flow diagram of a method in accordance with several embodiments.

Referring now to FIG. 8, a method for generating electrical energy with shopping carts is shown. In step 810, a generator assembly is coupled to a shopping cart. A generator assembly may comprise one or more of a generator, capacitor element, and contacts described with reference to FIG. 1-6 herein. In some embodiments, a generator assembly may be retrofitted onto a conventional shopping cart. For example, a generator may be added to a back wheel of a shopping cart and a capacitor element for storing the generated energy may be formed with and/or around an existing elongated member of a shopping cart. For example, a dielectric layer and an electrode layer may be wrapped around a portion of the bottom frame of a shopping to form a capacitor element. In some embodiments, the generator assembly may be integrated with and/or manufactured with the shopping cart.

In step 820, energy is generated with a shopping cart. Energy may generally be generated by the movement of the shopping cart. In some embodiments, the electrical energy may be generated from converting kinetic energy from the rotation of a wheel to electrical energy with a generator coupled to the wheel. The generated energy may be stored in a capacitor element on the shopping cart. In some embodiments, the energy may be generated by a generator described with reference to FIGS. 1 and 3 above. Generally, electrical energy is generated when a shopping cart is pushed around a shopping facility by a customer or an associate.

In step 830, two or more shopping carts are coupled to each other. In some embodiments, shopping carts are configured to be docked for storage. For example, basket portions of shopping carts may include a swinging rear door configured to partially receive the basket portion of another similar shopping cart. When a shopping cart is returned to a cart storage, return, and/or retrieval area, customers and/or associates may push one shopping cart into the back of another to dock the cart. A plurality of shopping carts may be docked together to form a chain of shopping carts. In some embodiments, when the shopping carts are docked together, the electrical contacts of the generator assemblies of the carts are configured to make contact with each other such that the capacitor elements on the carts are electrically coupled. In some embodiments, each capacitor element is configured to be connected in parallel to each other. For example, the positive terminals of each capacitor element may be coupled together while the negative terminals of each capacitive element may be coupled together. In some embodiments, the capacitor elements are electrically coupled as soon as the carts are docked together. In some embodiments, a sensor device may switch the capacitor elements from a charging state to a discharge state when sensor senses that another shopping cart or discharge device has been docked with the shopping cart.

In step 840, the energy stored in the capacitive elements of shopping carts are discharged to a discharge device. In some embodiments, step 840 is automatically triggered when shopping carts are docked with a discharge device. For example, a discharge device may automatically complete the circuit between the positive and negative terminals of the capacitor elements on the shopping carts to discharge the stored energy. In some embodiments, step 840 may be selectively triggered by the discharge device. In some embodiments, step 840 may be manually triggered.

In step 850, the cart pusher is powered with the discharged energy. In some embodiments, step 840 may be triggered by a start switch on the cart pusher used to begin moving shopping carts from a stop state. The cart pusher may apply the discharged energy to a motor to drive the cart pusher to overcome the inertia from the stop state. In some embodiments, at least part of the discharged energy may be stored on a battery of the cart pusher.

In some embodiments, instead of step 850, the shopping carts may be coupled to a docking station that is coupled to an electric grid. The docking station may comprise a cart storage, return, and/or retrieval station. The discharged energy may be used to power devices typically powered by the electric grid. For example, the discharged energy may be used to power the lights, the coolers, the registers, etc. in a shopping facility through the electric grid.

In one embodiment, a shopping cart apparatus comprises a front wheel, a back wheel, a bottom frame coupled to the front wheel and the back wheel, and a power generator assembly. The power generator assembly comprises a generator coupled to the back wheel, the generator being configured to convert kinetic energy from a rotation of the back wheel to electrical energy, a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel, and a first contact member and a second contact member coupled to the capacitor element and configured to discharge the electrical energy stored in the capacitor element.

In one embodiment, a shopping cart apparatus comprises a front wheel, a back wheel, a bottom frame coupled to the front wheel and the back wheel, and a power generator assembly. The power generator assembly comprises a generator coupled to the back wheel, the generator being configured to convert kinetic energy from a rotation of the back wheel to electrical energy, a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel, and a first contact member and a second contact member coupled to the capacitor element and configured to discharge the electrical energy stored in the capacitor element.

In one embodiment, a method of discharging energy from shopping carts comprises: coupling two or more shopping carts to each other and to a discharge device, wherein each shopping cart comprises: a front wheel, a back wheel, a bottom frame coupled to the front wheel and the back wheel, and a power generator assembly comprising: a generator coupled to the back wheel, the generator being configured to convert kinetic energy from a rotation of the back wheel to electrical energy, a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel, and a first contact member and a second contact member coupled to the capacitor element and configured to discharge the electrical energy stored in the capacitor element.

In one embodiment, a method of providing an energy generating shopping carts comprises: coupling a shopping cart to a power generator assembly, wherein the shopping cart comprises: a front wheel, a back wheel, and a bottom frame coupled to the front wheel and the back wheel. Wherein the power generator assembly comprises: a generator coupled to the back wheel, the generator being configured to convert kinetic energy from a rotation of the back wheel to electrical energy, a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel, and a first contact member and a second contact member coupled to the capacitor element and configured to discharge the electrical energy stored in the capacitor element.

In one embodiment, a cart pusher apparatus comprises: a coupling structure configured to mechanically couple to a shopping cart, a wheel system configured to provide locomotion to one or more shopping carts coupled to the coupling structure, a motor configured to drive the wheel system, a control circuit coupled to the motor, and an electrical contact configured to contact a capacitor element of the shopping cart coupled to the coupling structure to receive electrical energy discharged from the capacitor element of the shopping cart. Wherein the control circuit is configured to: trigger a discharge of the electrical energy from the capacitor element; and apply the electrical energy to the motor to move the one or more shopping carts from a stop state.

In one embodiment, a method for powering a cart pusher comprises: coupling the cart pusher to one or more shopping carts via a coupling structure, coupling an electrical contact of the cart pusher to a contact of a capacitor element of a shopping cart, triggering a discharge of electrical energy stored in the capacitor element of the shopping cart from the capacitor element, applying the electrical energy to a motor configured to drive a wheel system of the cart pusher to move the one or more shopping carts from a stop state.

In one embodiment, a system for powering a cart pusher comprises: a plurality capacitor elements coupled together, each of the plurality of capacitor elements being a part of a shopping cart of a plurality of shopping carts that are coupled together, a cart pusher device comprising: an electrical contact; and a control circuit. Wherein the control circuit is configured to: trigger a discharge of electrical energy from the plurality of capacitor elements; and apply the electrical energy to a motor of the cart pusher device to move the plurality of shopping carts from a stop state.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

In some embodiments, a cart pusher apparatus comprises a coupling structure configured to mechanically couple to a shopping cart; a wheel system configured to provide locomotion to one or more shopping carts coupled to the coupling structure; a motor configured to drive the wheel system; a control circuit coupled to the motor; and an electrical contact configured to contact a capacitor element of the shopping cart coupled to the coupling structure to receive electrical energy discharged from the capacitor element of the shopping cart; wherein the control circuit is configured to: trigger a discharge of the electrical energy from the capacitor element; and apply the electrical energy to the motor to move the one or more shopping carts from a stop state. The capacitor element of the shopping cart is electrically coupled to capacitor elements of additional shopping cars prior to being coupled to the electrical contact; and wherein the control circuit is further configured to trigger the discharge of electrical energy from the capacitor elements of the additional shopping carts through the electrical contact. The shopping cart comprises: a generator configured to convert kinetic energy from a rotation of a back wheel of the shopping cart to electrical energy. The capacitor element of the shopping cart is configured to store electrical energy generated from a movement of the shopping cart. The apparatus further comprising: a power source coupled to the motor and configured to store at least a portion of the electrical energy discharged from the capacitor element. The apparatus further comprising: a power source configured to supply power to the motor in an absence of the electrical energy discharged from the capacitor element. The apparatus further comprising: a start switch for starting the motor, wherein the discharge of the electrical energy is triggered when the start switch is activated. The coupling structure comprises a rigid elongated member configured to extend the electrical contact under at least one of the one or more shopping carts to couple the electrical contact with the contact of the capacitor element. The electrical contact comprises two contact points spaced apart on the rigid elongated member. The coupling structure comprises a cable configured to couple the electrical contact with the contact of the capacitor element.

In some embodiments, a method for powering a cart pusher comprises coupling the cart pusher to one or more shopping carts via a coupling structure; coupling an electrical contact of the cart pusher to a contact of a capacitor element of a shopping cart; triggering a discharge of electrical energy stored in the capacitor element of the shopping cart from the capacitor element; applying the electrical energy to a motor configured to drive a wheel system of the cart pusher to move the one or more shopping carts from a stop state. The capacitor element of the shopping cart is electrically coupled to capacitor elements of additional shopping cars prior to being coupled to the electrical contact; and wherein the discharge of the electrical energy comprises discharging electrical energy from the capacitor elements of the additional shopping carts through the electrical contact. The shopping cart further comprises: a generator configured to convert kinetic energy from a rotation of a back wheel of the shopping cart to electrical energy. The capacitor element of the shopping cart is configured to store electrical energy generated from a movement of the shopping cart. The shopping cart further comprises: a power source coupled to the motor and configured to store at least a portion of the electrical energy discharged from the capacitor element. The cart pusher further comprises a power source configured to supply power to the motor in an absence of the electrical energy discharged from the capacitor element. The cart pusher further comprises: a start switch for starting the motor, wherein the discharge of the electrical energy is triggered when the start switch is activated. The coupling structure comprises a rigid elongated member configured to extend the electrical contact under at least one of the one or more shopping carts to couple the electrical contact with the contact of the capacitor element. The electrical contact comprises two contact points spaced apart on the rigid elongated member. The coupling structure comprises a cable configured to couple the electrical contact with the contact of the capacitor element.

In some embodiments, a system for powering a cart pusher comprises a plurality capacitor elements coupled together, each of the plurality of capacitor elements being a part of a shopping cart of a plurality of shopping carts that are coupled together; a cart pusher device comprising: an electrical contact; and a control circuit, wherein the control circuit is configured to: trigger a discharge of electrical energy from the plurality of capacitor elements; and apply the electrical energy to a motor of the cart pusher device to move the plurality of shopping carts from a stop state.

What is claimed is:

1. A shopping cart apparatus comprising:
    a front wheel;
    a back wheel;
    a bottom frame coupled to the front wheel and the back wheel; and
    a power generator assembly comprising:
        a generator coupled to the back wheel, the generator being configured to convert kinetic energy from a rotation of the back wheel to electrical energy;
        a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel; and
        a first contact member and a second contact member coupled to the capacitor element and configured to discharge the electrical energy stored in the capacitor element.

2. The apparatus of claim 1, wherein the dielectric material comprises a dielectric layer formed around the elongated member of the bottom frame and the second electrode comprises a conductor layer formed around the dielectric layer.

3. The apparatus of claim 1, wherein the capacitor element comprises a cylindrical capacitor element and the dielectric material comprises a cylindrical dielectric layer.

4. The apparatus of claim 1, wherein the generator comprises one or more of: a direct current power generator and an alternating current power generator.

5. The apparatus of claim 1, wherein the power generator assembly further comprises a sensor device configured to determine a presence of a powered device, and wherein the capacitor element is configured to only discharge when the powered device is detected by the sensor device.

6. The apparatus of claim 1, wherein one of the first contact member is positioned in front of the bottom frame and is configured to contact a contact member on a second shopping cart when the shopping cart apparatus is docked into the second shopping cart.

7. The apparatus of claim 1, wherein the second contact member is positioned along a length of the elongated member and is configured to contact a contact member on a second shopping cart when the second shopping cart is docked into the shopping cart apparatus.

8. The apparatus of claim 1, wherein the capacitor element is configured to discharge the electrical energy stored in the capacitor element to one or more of a cart pusher vehicle and a docking station connected to a main electric grid.

9. The apparatus of claim 1, wherein the capacitor element is configured to discharge the electrical energy stored in the capacitor element to a docking station connected to a main electric grid.

10. The apparatus of claim 1, wherein an axle orientation of the back wheel is fixed relative to the bottom frame of the shopping cart apparatus.

11. A method of discharging energy from shopping carts comprising:
    coupling two or more shopping carts to each other and to a discharge device, wherein each shopping cart comprises:
        a front wheel;
        a back wheel;
        a bottom frame coupled to the front wheel and the back wheel; and
        a power generator assembly comprising:
        a generator coupled to the back wheel, the generator being configured to convert kinetic energy from a rotation of the back wheel to electrical energy;
        a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel; and
        a first contact member and a second contact member coupled to the capacitor element and configured to discharge the electrical energy stored in the capacitor element.

12. The method of claim 11, wherein the dielectric material comprises a dielectric layer formed around the elongated member of the bottom frame and the second electrode comprises a conductor layer formed around the dielectric layer.

13. The method of claim 11, wherein the capacitor element comprises a cylindrical capacitor element and the dielectric material comprises a cylindrical dielectric layer.

14. The method of claim 11, wherein the generator comprises one or more of: a direct current power generator and an alternating current power generator.

15. The method of claim 11, wherein the power generator assembly further comprises a sensor device configured to determine a presence of a powered device, and wherein the capacitor element is configured to only discharge when the powered device is detected by the sensor device.

16. The method of claim 11, wherein one of the first contact member is positioned in front of the bottom frame and is configured to contact a contact member on a second shopping cart when the shopping cart is docked into the second shopping cart.

17. The method of claim 11, wherein the second contact member is positioned along a length of the elongated member and is configured to contact a contact member on a second shopping cart when the second shopping cart is docked into the shopping cart.

18. The method of claim 11, wherein the discharge device comprises one or more of a cart pusher vehicle and a docking station connected to a main electric grid.

19. The method of claim 11, wherein the discharge device comprises a docking station connected to a main electric grid.

20. The method of claim 11, wherein an axle orientation of the back wheel is fixed relative to the bottom frame of the shopping cart.

21. A method of providing an energy generating shopping carts comprising:
    coupling a shopping cart to a power generator assembly, wherein the shopping cart comprises:
        a front wheel;
        a back wheel; and
        a bottom frame coupled to the front wheel and the back wheel; and
    wherein the power generator assembly comprises:
        a generator coupled to the back wheel, the generator being configured to convert kinetic energy from a rotation of the back wheel to electrical energy;
        a capacitor element coupled to the generator and configured to store the electrical energy generated by the generator, the capacitor element comprising a first electrode and a second electrode separated by a dielectric material, wherein the first electrode comprises an elongated member of the bottom frame extending from the back wheel toward the front wheel; and
        a first contact member and a second contact member coupled to the capacitor element and configured to discharge the electrical energy stored in the capacitor element.

* * * * *